United States Patent [19]

[11] 4,305,116

[45] Dec. 8, 1981

Huber

[54] COVER PLATE FOR VEHICLE LIGHTS

[75] Inventor: Guntram Huber, Aidlingen, Fed. Rep. of Germany

[73] Assignee: Daimler-Benz Aktiengesellschaft, Stuttgart, Fed. Rep. of Germany

[21] Appl. No.: 148,784

[22] Filed: May 12, 1980

[30] Foreign Application Priority Data

May 10, 1979 [DE] Fed. Rep. of Germany ....... 2918868

[51] Int. Cl.[3] ................................ B60Q 1/00

[52] U.S. Cl. ................................ 362/83; 362/290; 362/311; 362/354; 362/355; 362/360

[58] Field of Search ................ 362/83, 290, 311, 354, 362/355, 360

[56] References Cited

U.S. PATENT DOCUMENTS 2,358,636 9/1944 Hartley ................................ 362/354

*Primary Examiner*—Stephen J. Lechert, Jr.
*Attorney, Agent, or Firm*—Craig and Antonelli

[57] ABSTRACT

A cover plate for vehicle lights, especially taillights of automotive vehicles, which includes an outwardly oriented surface of the cover plate which, as viewed in a vertical section, is fashioned of a meander shape. At least a part of the horizontal lying areas of the cover plate are made to be at least extensively opaque by, for example, a dark surface coating or dark inserts which are integrally cast or injection molded into the horizontal areas of the cover plate.

7 Claims, 2 Drawing Figures

COVER PLATE FOR VEHICLE LIGHTS

Figure 1:
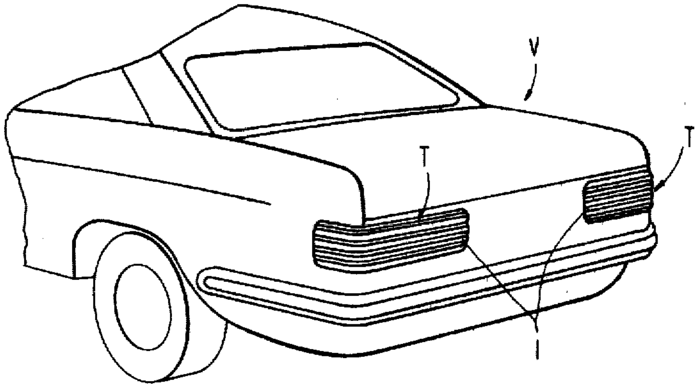

The present invention relates to a cover arrangement and, more particularly, to a cover plate or shield for lights of motor vehicles, especially for taillights of automotive vehicles, wherein an outwardly oriented surface of the cover plate or shield is constructed, as viewed in a vertical section, of a meander shape.

It is known that, due to the so-called external-light sensitivity of motor vehicle taillights, false signals can be simulated to drivers following a motor vehicle. For example, false signals may occur if incident sunlight is reflected in an especially unfavorable manner by a reflector of the vehicle taillights.

Since the occurrence of false signals represents a potential safety problem which, in essence, defeats the purpose of vehicle taillights, to prevent the simulation or false signals by reflectors of the taillights, it has been proposed to arrange horizontal lamellae of opaque material in an interior of the vehicle taillight between the taillight and the cover plate or shield. However, a disadvantage of this proposed arrangement resides in the fact that, for spatial reasons, it is frequently difficult to carry out such proposal. A further disadvantage of this arrangement resides in the fact that considerable additional expenditures are required to construct a taillight in such a proposed manner.

The aim underlying the present invention essentially resides in providing a cover plate or shield of the type described hereinabove wherein the external-light sensitivity of the vehicle taillight is at least extensively reduced with a minimum of additional cost.

In accordance with advantageous features of the present invention, at least a portion of horizontally lying areas of the cover or shield plate for the taillight is made to be at least extensively opaque.

In accordance with further advantageous features of the present invention, the horizontal areas exhibit an at least extensively opaque, matte, preferably dark surface coating.

Advantageously, the at least extensively opaque sections of the horizontal lying areas in accordance with the present invention may be accomplished by preferably dark inserts integrally cast or injection molded into the horizontal areas.

Accordingly, it is an object of the present invention to provide a cover or plate shield for vehicle lights which avoids, by simple means, shortcomings and disadvantages encountered in the prior art.

Another object of the present invention resides in providing a cover or plate shield for vehicle taillights which minimizes the occurrences of a simulation of a false signal.

A still further object of the present invention resides in providing a cover or plate shield for motor vehicle taillights which minimizes the external light sensitivity thereof.

Yet another object of the present invention resides in providing a cover or plate shield for motor vehicle taillights which is simple in construction and therefore relatively inexpensive to manufacture.

Figure 2:
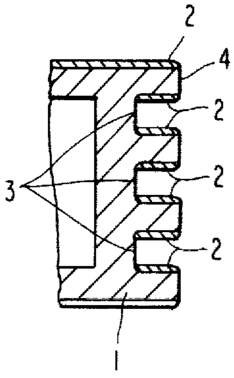

These and other objects, features, and advantages of the present invention will become more apparent from the following description when taken in connection with the accompanying drawings which show, for the purposes of illustration only, one embodiment in accordance with the present invention, and wherein:

FIG. 1 is a partial perspective view of a rear portion of a passenger motor vehicle equipped with a plate or shield for a taillight constructed in accordance with the present invention; and FIG. 2 is a vertical cross sectional view, on an enlarged scale, of the cover plate or shield of the taillight of FIG. 1.

Referring now to the drawings wherein like reference numerals are used in both views to designate like parts and, more particularly, to FIG. 1, according to this Figure, a passenger motor vehicle generally designated by the reference character V is provided, in a conventional manner, with taillights generally designated by the reference character T with each of the taillights T being provided with a cover or shield plate 1.

As shown in FIG. 2, the cover plate 1, in a vertical sectional view, is of a meander shape, that is, the cover plate is provided with outwardly disposed or oriented horizontal surfaces 2 and vertical surfaces 3, 4.

The horizontal surfaces 2 are constructed so as to be at least partially opaque thereby reducing the external light sensitivity of the cover or shield plate 1. For this purpose, the horizontal surfaces 2 may be provided with an appropriate opaque or dark surface coating or light-impermeable inserts may be incorporated into the cover plate 1. The dark inserts may be integrally cast or injection molded into the horizontal areas 2 of the cover or shield plate 1.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A cover plate for vehicle lights, the cover plate including an outwardly facing surface provided with a plurality of translucent horizontal surface portions interconnected by a plurality of translucent vertical surface portions such that, in a vertical section, the cover plate has a meander shape, characterized in that means are provided at the translucent horizontal surface portions for rendering at least a portion of the translucent horizontal surface portions extensively opaque.

2. A cover plate according to claim 1, characterized in that said means for rendering at least a portion of the horizontal surface portions extensively opaque includes a surface coating provided on the horizontal surface portions.

3. A cover plate according to claim 2, characterized in that the surface coating is of a dark material.

4. A cover plate according to claim 2, characterized in that the surface coating results in the horizontal surface portion having a matte finish.

5. A cover plate according to claim 1, characterized in that the means for rendering at least a portion of the horizontal surface portions extensively opaque includes dark inserts integrally cast into the cover plate.

6. A cover plate according to claim 1, characterized in that the means for rendering at least a portion of the horizontal surface portions extensively opaque includes dark inserts injection molded into the horizontal areas of the cover plate.

7. A cover according to one of claims 1, 2, 3, 4, 5, or 6, characterized in that the vehicle lights are taillights of a passenger motor vehicle.

* * * * *